United States Patent [19]

Sata et al.

[11] 3,847,772

[45] Nov. 12, 1974

[54] SELECTIVE ELCTRODIALYSIS OF CATIONS

[75] Inventors: Toshikatsu Sata; Masakatsu Nishimura, both of Tokuyama; Ryuji Izuo, Kudamatsu, all of Japan

[73] Assignee: Tokuyama Soda Kabushiki Kaisha, Yamaguchi-ken, Japan

[22] Filed: May 21, 1973

[21] Appl. No.: 362,455

[30] Foreign Application Priority Data

May 22, 1972 Japan ..........................47-49871

[52] U.S. Cl. ............................................ 204/180 P
[51] Int. Cl. ......................................... B01d 13/02
[58] Field of Search ................. 204/180 P, 301, 296

[56] References Cited

UNITED STATES PATENTS

| | | | |
|---|---|---|---|
| 3,510,417 | 5/1970 | Mizutani et al. | 204/180 P |
| 3,510,418 | 5/1970 | Mizutani et al. | 204/180 P |

*Primary Examiner*—John H. Mack
*Assistant Examiner*—A. C. Prescott
*Attorney, Agent, or Firm*—Sherman & Shalloway

[57] ABSTRACT

In a method of electrodialyzing an aqueous electrolytic solution containing two or more classes of cations of differing valences, using a cation-exchange membrane, the improvement which comprises using a cation-exchange membrane in which a cationic substance has been caused to be present at the substantial surface thereof and adjusting the pH of said electrolytic solution to a pH ranging between 2.5 and 8.0 thereby to selectively electrodialyze the cations of smaller charge.

8 Claims, No Drawings

SELECTIVE ELCTRODIALYSIS OF CATIONS

This invention relates to a method of selectively permeating cations of smaller charge by electrodialyzing an electrolytic solution containing two or more classes of cations of differing valences.

Various cation-exchange membranes have been proposed to date for the purpose of selectively electrodialyzing only the specific cations from a solution containing cations of differing charges (valences) in a mixed state, such as in the case of seawater. For instance, there is an ion-exchange membrane having a highly cross-linked resinous structure, a cation-exchange membrane on which has been formed a condensed type highly cross-linked resin, an ion-exchange membrane containing both the anion and cation-exchange groups, or a membrane consisting of a lamination of an anion and a cation-exchange membrane. However, the manufacture of these cation-selective permeable membranes is very difficult and, in addition, they possess shortcomings in their properties in that their electric resistance is high, transport number is low, a drop is seen in their limiting current density decrease, and their durability is poor. Hence, there was a demand for the development of a much more excellent cation-exchange membrane and an electrodialytic method for selectively permeating from among the cations having differing charges those cations of smaller charge. For this purpose, there has been previously proposed, in U.S. Pat. Nos. 3,510,417 and 3,510,418 a method of using a cation-exchange membrane whose surface has been treated and either adhered with or chemically bonded with a substance having a molecular weight of at least 100 and containing in its molecular structure a functional group capable of being converted to cations in an aqueous solution, or a method wherein in carrying out the electrodialysis with a cation-exchange membrane, a substance having a molecular weight of at least 100 and containing in its molecular structure a functional group capable of being converted to cations in an aqueous solution is added and thus caused to be present at the surface of the membrane in carrying out the electrodialysis.

The object of the present invention is to provide a method of much higher efficiency than that of the conventional methods in the electrodialysis selectively of cations of smaller charge from among two or more classes of cations of differing valences.

The present invention is directed to a method of selectively electrodialyzing cations of lower valence, which is characterized in that in the electrodialysis of an aqueous electrolytic solution containing two or more classes of cations of differing valences the cation-exchange membrane used is one in which a cationic substance has been caused to be uniformly present at the surface or neighborhood of the surface (hereinafter to be generically referred to as the substantial surface) and the pH of the electrolytic solution is adjusted to 2.5 – 8.0.

The invention will be more fully described below.

While it is already known that cations of lower valence can be selectively permeated by carrying out the electrodialysis of an electrolytic solution containing two or more classes of cations of differing charges using a cation-exchange membrane in which a cationic substance has been caused to be uniformly present at the substantial surface thereof, we found that by specifying in this case the use of an electrolytic solution having a pH of 2.5 – 8.0, and preferably 3.0 – 7.5, a marked improvement could be achieved in the selective permeability of these cations. Morover the contamination of the surface of the membrane by colloidal substances and large organic ionic substances could be eliminated and a still further improvement could be achieved in the durability of the membrane.

In this invention, a conventional cation-exchange membrane can be used on whose substantial surface the cationic substance is caused to be present. Usuable are cation-exchange membranes which have as the cation-exchange group a sulfonic acid, carboxylic acid, phosphonic acid, thiol, phenol, sulfuric acid ester, phosphoric acid ester or other functional group having a negative charge, i.e., those cation-exchange membranes in which exchangable groups are present. Various means of adhering the catonic substance to the membrane are possible. For example the cationic substance may be adhered to the surface by means of a physical adhesive force, adhered to the surface by an electric attractive force, by a means in which the high molecular chain of the membrane and the cationic substance are in intertwinement, or by a means in which the cationic substance is integrated with the membrane-forming substance by a chemical bond.

As the cationic substance present at the substantial surface of the cation-exchange membrane. This is while no particular restrictions are imposed and any substance that is soluble in either water or an organic solvent and can form cations in the solution will do, a substance whose molecular weight is above 100 is to be preferred, because there is the advantage that the cationic substance present at the surface of the cation-exchange membrane thus does not readily permeate to the interior of the membrane, with the consequence that the intramembrane cation transport number does not decline and the increase in the electric resistance of the membrane is small. However, when macromolecules are formed by integration with the membrane-forming substance (ion exchange membrane) by chemically bonding the cationic substance to the surface of the cation-exchange membrane, the molecular weight of the cationic substance may be small. The cationic substances, which are typically used in the invention method, include, for example, amines phosphonium salts, sulfonium salts, stibonium salts, arsonium salts and metal complex compounds. However, so long as the substance is one having a positive charge, it can be effectively used without any restriction. As the foregoing amines, are included the primary, secondary and tertiary amines and the salts thereof or those having a functional group such as the quaternary ammonium group. Examples are laurylamine, lauryltrimethylammonium chloride, triethanolamine, stearamidoethyldiethylamine, polyvinyl pryridines, polyvinyl carbazoles, polyvinyl imidazoles and polyethylenepolyamines, of which the polyamines, especially polyethyleneimine, are of commercial advantage. As the metal complex compounds, are included: the four or six-coordinate complexes of transition metals composed of a metal such as Co, Ni, Fe etc. and a ligand such as $NH_3$, CN, ethylenediamine, halogens, NO, $NO_2$, triethylenetetramine, tetraethylenepentamine and amino acids, and having a positive charge; the coordinate compounds composed of a metal such as Co, Ni, Fe, Ca, Mg etc., and a chelating agent such as ethylenediaminetetraacetic acid, iminodiacetic acid and salicylic acid, and having a positive charge and a metallocene such as cobaltcene, ferrocene, vanadocene and the high molecular compounds thereof.

There is no particular restriction as to the method of effecting the presence of the aforesaid cationic substance at the substantial surface of the cation-exchange membrane. For instance, the generally practiced methods include that in which the cation-exchange membrane is immersed in either water or a solution of an organic solvent to effect the adhesion of the cationic substance to the surface of the cation-exchange membrane or that in which a solution of the cationic substance of a suitable concentration is applied to the surface of the cation-exchange membrane by known coating techniques. Alternately usable is a method in which the cationic substance is caused to be adsorbed to the substantial surface of the cation-exchange membrane by conducting the electrophoresis in an aqueous electrolytic solution containing the cationic substance. In this case the cationic substance present at the substantial surface of the cation-exchange membrane can be secured relatively firmly to the surface as a result of the physical adsorptive force as well as the electrical bond formed between the cation-exchange group of the cation-exchange membrane and the cationic substance. Further, if necessary, the cationic substance can also be firmly secured by using a binding agent. Again, the cationic substance may also be formed as a thin cationic layer at the substantial surface of the cation-exchange membrane, say, by either an ionic bond, covalent bond, coordinate bond, or the intertwinement of a graft polymer chain. In addition, good results are had by rendering this layer more intimate by means of partial crosslinking. Generally speaking, it is preferred that the cationic substance is caused to be present at the surface of the cation-exchange membrane either by immersion or application by spraying, or by chemical means, in an amount of at least 0.001 mg, and preferably at least 0.01 mg, per 1 $dm^2$ of the surface of the cation-exchange membrane.

One method of controlling the pH according to this invention consists of continuously adjusting the pH of the aqueous electrolytic solution that is fed to the electrodialysis by constantly adding thereto an acidic substance. Another method consists of the provision of a pH adjusting tank and adjusting the pH of the aqueous electrolytic solution in this tank before feeding it to the electrodialysis. Further, as a comercially feasible method, is that wherein an aqueous electrolytic solution adjusted to a pH of 2.5 – 8.0, and preferably 3.0 – 7.5, is fed intermittently with a solution to be submitted to electrodialysis, which is fed without adjustment of its pH. In carrying out the electrodialysis by intermittently feeding an aqueous electrolytic solution whose pH has been adjusted to 2.5 – 8.0, the relative transport number of the cation and the pure salt ratio can be measured, and the time and cycle in which the intermittent addition is to be made of the acidic substance may accordingly be suitably determined. Usually, when the aqueous electrolytic solution to which has been added the acidic substance (to adjust the pH to 2.0 – 8.0) and the pH-unadjusted solution to be submitted to electrodialysis, e.g., seawater (pH 8.2), are fed at a ratio with respect to time of above 1:100, the effect of the selective permeation of cations of smaller charge can be enhanced. Usable as the acidic substance to be added to the electrolytic solution in this invention are inorganic acids such as hydrochloric acid and sulfuric acid, organic acids such as acetic acid, or high molecular weight acids such as polystyrenesulfonic acid and ligninsulfonic acid. While the effect of the selective permeation of the cations of lower valence is demonstrated even in the case where the pH of the electrolytic solution to be electrodialyzed is adjusted to below 2.5, this is to be avoided, because not only is the surface of the cation-exchange membrane treated with the cationic substance impaired, but also it is economically a disadvantage.

In theory, the electrodialytic method in accordance with the present invention is that wherein the two or more classes of cations of differing valence present in the solution are electrodialyzed via a cation-exchange membrane having a cationic substance at its substantial surface to thereby selectively permeate particularly the cations of lower valence. While it must be obvious that where only specific cations of smaller charge are to be taken out from the electrolytic solution the electrodialysis can be conducted using only the cation-exchange membrane whose surface has been treated with a cationic substance, in the case where it is necessary to take out both anions and cations, the cation-exchange membrane on whose surface has been deposited the cationic substance of the present invention and the usual anion-exchange membrane can be suitably used conjointly. Accordingly, the present invention is generally applicable to the separation of acids or bases, or the desalting and concentration of salt waters such as seawater, concentrated seawater and brine, or the double decomposition of salt. It is especially applied with advantage to solutions such as seawater, waste seawater and brine. Also its application directly to a solution which has become acid or has a pH of 2.5 to 8.0 as the result of another process or after mixing with a solution of a pH of below 8.0 is of great advantage.

The following examples will now be given for more fully illustrating the present invention. In the examples, the cation-exchange membrane whose surface has been deposited with a cationic substance was used in all cases paired with a methaphenylenediamine-treated anion-exchange membrane (the anion-exchange membrane having selective permeation for anions of smaller charge disclosed in Japanese application publication No. 3913/1967). A plurality of the so paired membranes were disposed between the two electrodes, and the electrodialysis was carried out, for example, by causing seawater of the following composition to flow at the rate of 6 centimeters per second through each of the several compartments.

Composition of seawater

| | |
|---|---|
| Cl | 0.53 eq. (N)/liter |
| $SO_4$ | 0.05 |
| Ca | 0.02 |
| Mg | 0.11 |
| K | 0.01 |
| Na | 0.44 |

The electrodialysis of the seawater of the foregoing composition was carried out at the prescribed pHs of the several examples with a current density of 2A/$dm^2$ to the membrane surface (effective area 1.0 $m^2$). After the passage of the prescribed period of time, the concentrated solutions of the several compartments, after their compositions had achieved equilibrium, were collected and analyzed. The relative transport number $P_{M_1}{}^{M_2}$ and the pure salt ratio were then calculated as follows:

$$P_{M_1}{}^{M_2} = (CM_2/CM_1) \text{ concentrated solution}/CM_2/CM_1) \text{ seawater} \quad (1)$$

where $(CM_1)$ concentrated solution and $(CM_2)$ concentrated solution are respectively the equilibrium concentrations of the $M_1$ and $M_2$ ions in the concentrated solution; and $(CM_1)$ seawater and $(CM_2)$ seawater are respectively the concentrations of the $M_1$ and $M_2$ ions in the seawater.

Pure salt ratio $(\%) = [Na] + [K]/[Cl] \times 100$ where the [Na], [K] and [Cl] are respectively the equivalent concentrations of the Na, K and Cl ions in the concentrated solution.

In the examples, the parts and percentages are on a weight basis unless otherwise specified.

EXAMPLE 1

A pasty mixture consisting of a homogeneous mixture of 100 parts of finely divided polyvinyl chloride, 90 parts of styrene, 10 parts of divinylbenzene of 50 % purity, 30 parts of dioctyl phthalate and 1 part of benzoyl peroxide was applied to a 1.6-mesh polyethylene netting and, after covering the two sides of the netting with cellophane the polymerization of the coated netting was carried out for 3 hours at 110°C. to obtain a membranous, macromolecular product. This product was then dipped for 24 hours in 98 % sulfuric acid at 50°C. to convert it into a cation-exchange membrane having the sulfonic acid group as the ion-exchange group.

Next, the surface of the foregoing cation-exchange membrane was treated by immersing the membrane for 6 hours in an aqueous solution containing 2,000 ppm of polyethyleneimine.

A cation-exchange membrane obtained by treating with polyethyleneimine in this manner was used, and the continuous concentration of seawater of pH 8.2 by the electrodialysis thereof was carried out. In this case, it was possible to maintain fully the relative transport numbers of $P_{total\ cations}{}^{Ca} = 0.7$ and $P_{total\ cations}{}^{Mg} = 0.4$ for a short period of time (a period of less than 3 months), but after the passage of 3 months, a slight rise in the foregoing relative transport numbers was noted. However, when the electrodialysis was continued after adjusting the pH of the seawater to 2.5 – 7.5 by the addition of an acid, the relative transport numbers again declined to $P_{total\ cations}{}^{Ca} = 0.7$ or less and $P_{total\ cations}{}^{Mg} = 0.4$, and a high pure salt ratio was shown. When seawater whose pH was adjusted to 2.5 – 7.5 from the start was used and its continuous electrodialytic concentration was carried out, practically no degradation of the relative transport number of the monovalent cations to the divalent cations was noted, even though the operation was continued for more than 6 months.

In Table 1 are shown the results obtained when the concentration of seawater was carried out by continuous electrodialysis, using seawaters whose pH had been adjusted as indicated therein.

Table 1

| Experiment No. | pH of seawater | Pure salt ratio (%) | Current efficiency (%) | $P_{M+}{}^{M++}$ |
|---|---|---|---|---|
| 1 | 8.2 | 88 | 91 | 0.50 |
| 2 | 6.6 | 90 | 91 | 0.37 |
| 3 | 6.2 | 91 | 91 | 0.34 |
| 4 | 5.0 | 92 | 91 | 0.30 |
| 5 | 4.2 | 93 | 91 | 0.26 |

In Table 1, while Experiment No. 1 shows the results obtained after the passage of 3 months, and the results of the Experiments Nos. 2 – 5 are the average values after the passage of respectively 3, 6, 9 and 12 months, there was noted practically no change in the values of these latter periods. $M^{++}$ and $M^+$ represent respectively the concentrations of the divalent cations (total of $Ca^{++}$ and $Mg^{++}$) and the monovalent cations (total of $Na^+$ and $K^+$) in the concentrated brine.

By way of comparison, when the electrodialysis off the foregoing seawaters was carried out with a cation-exchange membrane which had not been treated with polyethyleneimine, the pH of the seawater had no effect, and the pure salt ratio was 72 – 74 %.

EXAMPLE 2

A polyethyleneimine-treated cation-exchange membrane obtained as in Example 1 was used, and the electrodialytic concentration of seawater was carried out by causing to flow, as shown in Table 2, intermittently for the respective prescribed periods of time a seawater of pH 8.2 and seawaters whose pHs had been adjusted, as indicated, by the addition of an acid. The relative transport number of cations $P_{M+}{}^{M++}$ and the pure salt ratio of the resulting concentrated brine are shown in Table 2. While the results of the Experiments Nos. 1 – 4 in Table 2 are the average values respectively of 3, 6, 9 and 12-month operations, practically no change in the values during these periods is noted.

Table 2

| Experiment No. | pH of seawater to be concentrated and time of flow | | | | Pure salt ratio (%) | $P_{M+}{}^{M++}$ |
|---|---|---|---|---|---|---|
| | Acid-added seawater | | Fresh seawater not added with acid | | | |
| | pH | Time of flow (min.) | pH | Time of flow (min) | | |
| 1 | 6.4 | 6 | 8.2 | 6 | 90 | 0.37 |
| 2 | 6.3 | 6 | 8.2 | 18 | 89 | 0.42 |
| 3 | 4.0 | 6 | 8.2 | 6 | 92 | 0.34 |
| 4 | 4.0 | 6 | 8.2 | 18 | 91 | 0.37 |
| 5 | Fresh seawater of constant pH 8.2 | | | | 88 | 0.50 |

It was found from the foregoing results that, as compared with the case where seawater of pH 8.2 was used constantly, the permselectivity for cations and the pure salt ratio were satisfactory and these properties could be maintained at adequate levels for more than three months when the electrodialytic concentration of seawater was carried out by alternately electrodialyzing seawater of pH 4.0 – 7.5 and seawater of pH 8.2. Further, the membrane also exhibited excellent durability.

EXAMPLE 3

A commercially available styrene-divinylbenzene type of sulfonic acid type cation-exchange membrane was immersed for 4 hours in a 1 % methanol solution of poly-2-methyl-5-vinylpyridine (molecular weight 10,000), following which it was exposed to gamma rays from a source of $Co^{60}$ radiation to effect its graft reaction. The excess poly-2-methyl-5-vinylpyridine on the cation-exchange membrane was then removed by washing in methanol. This was followed by dipping the membrane for 16 hours in a 1:1 (weight ratio) combined solution of methanol and methyl iodide to transform the pyridine groups of the surface of the membrane to quaternary ammonium groups. The electric resistance of the so obtained poly-2-methyl-5-vinylpyridine-treated cation-exchange membrane in a 0.5N-NaCl solution with a direct-current was 6.1Ω-cm², while that of an untreated cation-exchange membrane was 5.6Ω-cm². The current efficiency of Na (transport number of the membrane) was in both cases 98 %.

Next, using the so obtained poly-2-methyl-5-vinylpyridine-treated cation-exchange membrane the concentration by electrodialysis of seawater (pH 8.2) and the several seawaters adjusted to the prescribed pHs was carried out as an Example 1 with the results shown in Table 3. The adjustment of the pH was performed with sulfuric acid.

EXAMPLE 5

A 0.2-mm-thick polyvinyl chloride film was immersed for 12 hours in a combined solution consisting of 200 parts of styrene, 50 parts of divinylbenzene, 20 parts of dioctyl phthalate, 2 parts of benzoyl peroxide and 50 parts of n-hexane, following which the film, after covering its two sides with cellophane, was polymerized for 4 hours in a 110°C. nitrogen atmosphere. The resulting macromolecular membrane was then converted to a cation-exchange membrane by submitting it to a sulfonation treatment by immersing it for 12 hours in 98 % sulfuric acid at 60°C.

The foregoing cation-exhange membrane was treated further by dipping it for 24 hours in an aqueous solution containing 1,000 ppm of a polymer consisting of poly-2-methyl-5-vinylpyridine in which 75 % of the pyridine groups was quaternarized (molecular weight 30,000).

Using the so treated cation-exchange membrane, the electrodialytic concentration of seawater of pH 8.2 and seawater adjusted to pH 5.5 were carried out as in Example 1 with the results shown in Table 5.

Table 3

| Experiment No. | pH of seawater | Pure sakt ratio (%) | | | Current efficiency (%) | | |
|---|---|---|---|---|---|---|---|
| | | At the start of concentration | One month later | Six months later | At the start of concentration | One month later | Six months later |
| 1 | 8.2 | 94 | 92 | 85 | 91 | 91 | 90 |
| 2 | 7.0 | 94 | 93 | 92 | 91 | 91 | 91 |
| 3 | 6.5 | 94 | 94 | 93 | 91 | 91 | 91 |
| 4 | 6.0 | 95 | 95 | 95 | 91 | 91 | 91 |
| 5 | 4.5 | 95 | 95 | 95 | 91 | 91 | 91 |

EXAMPLE 4

A condensed type cation-exchange membrane synthesized from sodium phenolsulfonate, phenol and formalin was immersed for 5 hours in a 1 % aqueous solution of polyethyleneimine (molecular weight 100,000), after which it was thoroughly washed in water to remove the excesss polyethyleneimine, and thereafter the graft reaction was carried out by its exposure to electron rays. The membrane was then submitted to a treatment to convert it to the tertiary and quaternary forms by immersing it for 5 hours in methanol containing 10 % of epichlorohydrin.

Using the so obtained cation-exchange membrane, the concentration of seawater of pH 8.2 and the several seawaters adjusted to the prescribed pHs were carried out by means of electrodialysis. The results obtained are shown in Table 4.

Table 5

| Experiment No. | Period of operation | Pure salt ratio in the case of seawater of pH 8.2 (%) | Pure salt ratio in the case of seawater of pH 5.5 (%) |
|---|---|---|---|
| 1 | 1 day | 93 | 94 |
| 2 | 1 month | 90 | 94 |
| 3 | 3 months | 87 | 92 |
| 4 | 6 months | 84 | 92 |

EXAMPLE 6

To a fabric made from polyvinyl chloride was applied a latex consisting of a copolymer of 30 parts of styrene and 70 parts of butadiene. After air-drying, it was submitted to a sulfonation treatment in 95 % sulfuric acid to obtain a cation-exchange membrane.

Table 4

| Experiment No. | pH of seawater | Current efficiency (%) | Pure salt ratio (%) | | | | |
|---|---|---|---|---|---|---|---|
| | | | At the start | 1 month later | 3 months later | 6 months later | 1 year later |
| 1 | 8.2 | 89 | 95 | 93 | 90 | 88 | 84 |
| 2 | 6.0 | 90 | 98 | 98 | 97 | 97 | 96 |
| 3 | 5.0 | 90 | 98 | 98 | 97 | 97 | 96 |

In Table 4 the values of the current efficiency are those obtained by averaging the values for a one-year period of operation.

Using the so obtained cation-exchange membrane, the electrodialysis of seawater of pH 8.2 and seawater whose pH was adjusted as indicated in Table 6 were carried out as in Example 1. In this case, cetyl pyridium chloride was continuously added in all instances to the seawater, while at the same time the pH of the seawater was adjusted with sulfuric acid. The results obtained are shown in Table 6.

Table 6

| Experiment No. | pH of seawater | Pure salt ratio (%) | | | | Current efficiency(%) |
|---|---|---|---|---|---|---|
| | | At the start | 1 month later | 6 months later | 1 year later | |
| 1 | 8.2 | 87 | 85 | 83 | 80 | 88 |
| 2 | 6.5 | 90 | 90 | 91 | 90 | 90 |
| 3 | 6.0 | 92 | 92 | 91 | 92 | 90 |
| 4 | 4.2 | 92 | 92 | 92 | 91 | 90 | ture of 100 parts of finely divided polyvinyl chloride, 100 parts of styrene, 10 parts of divinylbenzene of 50 % purity, 30 parts of dioctyl phthalate and 2 parts of benzoyl peroxide was applied to a polyvinyl chloride fabric and, after covering the two sides of coated fabric with cellophane, its polymerization was carried out for 4 hours at 110°C. to obtain a membranous high polymer. This was then submitted to a sulfonation treatment by dipping it for 24 hours in 98 % sulfuric acid at 60°C. to obtain a cation-exchange membrane having sulfonic groups as its ion-exchange groups.

Next, polyvinyl alcohol of a molecular weight of 20,000 was introduced with thiol groups and reacted as described in the method disclosed in the literature [J. of Japanese Industrial Chemical Society 59 853 (1956)] with methyl iodide to synthesize a linear macromolecular electrolytic substance. The surface of the above-described cation-exchange membrane was then treated by immersion for 16 hours in an aqueous solution containing 10,000 ppm of this linear macromolecular electrolytic substance.

The cation-exchange membrane obtained by treating in this manner was used, and the continuous concentration of seawater by electrodialysis was carried out as in Example 1, using seawater of pH 8.2 and those whose pHs had been adjusted as indicated in Table 8. The results obtained are shown therein.

Table 8

| Experiment No. | pH of seawater | Pure salt ratio (%) | | | | Current efficiency (%) |
|---|---|---|---|---|---|---|
| | | At the start | 1 month later | 3 months later | 6 months later | |
| 1 | 8.2 | 97 | 93 | 87 | 84 | 91 |
| 2 | 7.8 | 97 | 97 | 96 | 96 | 91 |
| 3 | 6.0 | 97 | 97 | 97 | 97 | 91 |
| 4 | 4.0 | 98 | 98 | 6.0 | 98 | 91 |

In Table 8, the values of the current efficiency are in all cases those obtained by averaging the values for a six-month period of operation.

EXAMPLE 9

A latex consisting of a copolymer of 30 parts of styrene and 70 parts of butadiene was applied to a glass fabric and dried, after which the resulting membranous high polymer was submitted to a sulfonation treatment with 95 % sulfuric acid at 30°C. to obtain a cation-exchange membrane having sulfonic acid groups as its ion-exchange groups.

Polystyrene of a molecular weight of 10,000 was then chloromethylated and thereafter reacted with triphenyl phosphine and then also with trimethylamine to obtain a linear macromolecular electrolytic substance having conjointly a quaternary phosphonium salt and a quaternary ammonium salt (molar ratio of phosphorus to nitrogen of 1:5).

Next, the above-described cation-exchange membrane was dipped in a 1 % aqueous solution of the above macromolecular electrolytic substance and thereafter exposed to gamma rays from a source of $Co^{60}$ radiation to effect the fixation of the macromolecular substance on the surface of the membrane by bonding.

Using the foregoing surface-treated cationexchange membrane and by operating as in Example 1, seawater concentrated to two times its original concentration In Table 6, the values of the current efficiency are those obtained by averaging the values for a 1-year period of operation.

EXAMPLE 7

A mixed monomeric solution consisting of 200 parts of styrene, 30 parts of divinylbenzene of 50 % purity, 100 parts of toluene and 5 parts of benzoyl peroxide was poured into a 0.5-mm space between two sheets of glass while sandwiching between the solution a fabric made from a copolymer of vinyl chloride and acrylonitrile, following which the solution was polymerized for 16 hours at 80°C. The resulting macromolecular, membranous product was then removed from between the glass sheets and submitted to a sulfonation treatment in an ethylene dichloride solution of a complex consisting of dioxane and sulfuric anhydride to convert the membranous product to a cation-exchange membrane.

Next, this cation-exchange membrane was immersed for 5 hours in a methanol solution of 1 % of polyethyleneimine and 1 % of benzoyl peroxide, following which the membrane was heated for 10 hours to fix the polyethyleneimine to the surface of the cation-exchange membrane.

Two of the so obtained cation-exchange membranes were disposed between an anode and a cathode in such a manner as to constitute an anodic compartment, an intermediate compartment and a cathodic compartment. The electrodialysis was then carried out by causing concentrated seawater (concentrated to two times the original concentration of seawater) of a pH indicated in Table 7 to flow into the anodic compartment, while saline and a caustic soda solution were caused to circulate through respectively the intermediate and cathodic compartments. The ratio of $Na^+ + K^+$ to the total cations in the intermediate compartment and the ratio of $Na^+ + K^+$ to total cations in the cathodic compartment after the passage of 5 hours are shown in Table 7.

Table 7

| Experiment No. | pH of concentrated seawater | $(K^+ + Na^+)$/total cations (%) | |
|---|---|---|---|
| | | Intermediate compartment | Cathodic compartment |
| 1 | pH 6.5 | 98.5 | 99.8 |
| 2 | pH 8.0 | 94.5 | 98.7 |

EXAMPLE 8

A pasty mixture consisting of a homogeneous mix-(Cl⁻ concentration 1.0 N, temperature 35°C.) was continuously electrodialyzed after adjusting the pH thereof to those prescribed. The results obtained are shown in Table 9.

Table 9

| Experi-ment No. | pH of sea-water | Pure salt ratio (%) | | | | Current efficiency (%) |
|---|---|---|---|---|---|---|
| | | At the start | 1 month later | 3 months later | 6 months later | |
| 1 | 8.4 | 93 | 90 | 86 | 82 | 91 |
| 2 | 8.0 | 93 | 93 | 92 | 91 | 91 |
| 3 | 7.0 | 93 | 93 | 93 | 93 | 91 |
| 4 | 6.0 | 94 | 94 | 93 | 94 | 91 |
| 5 | 5.2 | 94 | 95 | 94 | 94 | 91 |
| 6 | 3.4 | 95 | 95 | 94 | 95 | 91 |

EXAMPLE 10

A styrene-divinylbenzene copolymer of particle size of below 350 mesh was prepared by suspension polymerization, after which this copolymer was swelled with ethylene chloride and then sulfonated with 98 % sulfuric acid of 60°C. to obtain a finely divided cation-exchange resin. One hundred parts of this cation-exchange resin and 50 parts of finely divided polyethylene were then intimately mixed for 30 minutes with mixing rolls at 110°C. and formed into a sheet form to obtain a cation-exchange membrane.

Using the so obtained cation-exchange membrane, the continuous electrodialytic concentration of seawater was carried out, using seawater of pH 8.2 and those whose pHs had been adjusted as prescribed. In all instances, 10 ppm of hexamine cobalt complex ([Co(NH₃)₆]Cl₃) were added to the seawater being electrodialyzed for 4 hours daily. The results obtained are shown in Table 10.

When no addition of the hexamine cobalt complex ([Co(NH₃)₆]Cl₃) was made, the pure salt ratio in all cases was a constant value of 74 – 76 % irregardless of the pH. The current efficiency is an average value of 6 months.

Table 10

| Experi-ment No. | pH of sea-water | Pure salt ratio (%) | | | | Current efficiency (%) |
|---|---|---|---|---|---|---|
| | | At the start | 1 month later | 3 months later | 6 months later | |
| 1 | 8.2 | 85 | 82 | 80 | 78 | 91 |
| 2 | 7.7 | 86 | 85 | 85 | 85 | 91 |
| 3 | 6.6 | 86 | 86 | 85 | 85 | 91 |
| 4 | 5.2 | 86 | 85 | 86 | 86 | 91 |
| 5 | 2.5 | 87 | 87 | 87 | 87 | 91 |

EXAMPLE 11

In a combined solution consisting of 200 parts of styrene, 50 parts of divinylbenzene of 50 % purity, 20 parts of dioctyl phthalate, 2 parts of benzoyl peroxide and, as a diluent, 50 parts of n-hexane, was immersed a 0.2-mm-thick polyethylene sheet to impregnate same with the solution. This was followed by dipping the sheet in an aqueous 1.0 N sodium sulfate solution and then heat-polymerizing it to obtain a macromolecular membranous product, which was then submitted to a sulfonation treatment with 98 % sulfuric acid at 60°C. to convert it to a cation-exchange membrane having sulfonic acid groups.

The so obtained cation-exchange membane was submitted to a further immersion treatment in a 1 % aqueous solution of a substance containing a quaternary phosphonium salt obtained by reacting trimethoxyphenyl and dimethylsulfuric acid. Using the so obtained cation-exchange membrane, seawater of a concentration twice that of its original concentration was continuously electrodialytically concentrated while intermittently adjusting the pH with sulfuric acid as indicated in Table 11 with the results shown therein. The values of the current efficiency are average values of a 6-month operation.

Table 11

| Experiment No. | Concentrated seawater | | Concentrated seawater | | Pure salt ratio (%) | | | Current efficiency (%) |
|---|---|---|---|---|---|---|---|---|
| | pH | Time of flow | pH | Time of flow | At the start | 1 month later | 6 months later | |
| 1 | 6.0 | 1 min. | 8.4 | 20 min. | 87 | 86 | 87 | 91 |
| 2 | 6.0 | 1 hr. | 8.4 | 24 hrs. | 87 | 86 | 86 | 91 |
| 3 | 7.7 | 5 min. | 8.2 | 30 min. | 87 | 86 | 85 | 91 |
| 4 | 7.7 | 5 hrs. | 8.2 | 48 hrs. | 87 | 86 | 85 | 91 |
| 5 | 4.8 | 30 sec. | 8.2 | 20 min. | 88 | 87 | 86 | 91 |
| 6 | 4.8 | 10 min. | 8.2 | 10 min. | 88 | 87 | 87 | 91 |
| 7 | 3.5 | 15 min. | 8.2 | 60 min. | 88 | 87 | 87 | 91 |
| 8 | 3.5 | 12 sec. | 8.2 | 20 min. | 88 | 87 | 87 | 91 |
| 9 | 8.2 | | continuous | | 87 | 83 | 76 | 91 |

EXAMPLE 12

As in Example 1, a pasty mixture consisting of styrene, divinylbenzene, dioctyl phthalate, benzoyl peroxide and polyvinyl chloride was applied to a polyethylene netting, after which the two sides of the coated netting were covered with cellophane, and the heat-polymerization of the netting was carried out to obtain a membranous macromolecular product. This was then dipped for 4 hours at room temperature in a benzoylation bath consisting of 500 parts of carbon tetrachloride, 40 parts of anhydrous aluminum chloride and 34 parts of benzoyl chloride. Next, after washing the membranous macromolecular product in methanol and drying, it was submitted to a sulfonation treatment for 12 hours with 98 % sulfuric acid at 60°C. to convert it to a cation-exchange membrane.

Five parts of polystyrene of a molecular weight of about 10,000 in solution in 50 parts of carbon tetrachloride was then introduced to a benzoylation bath consisting of 8 parts of anhydrous aluminum chloride and 5 parts of benzoyl chloride and reacted for 5 hours followed by its introduction into water to introduce the benzoyl group at the rate of one for each four units of the styrene units. Next, the so obtained polystyrene derivative was submitted in customary manner to a chloromethylation reaction and further reacted with methyl sulfide in accordance with the procedure disclosed in the literature [J. of Japanese Ind. Chem. Society 61 (1) 131 (1953)] to obtain a cationic macromolecular electrolytic substance having the phosphonium group. Next, the above cationic macromolecular product was dissolved in water and sprayed uniformly on the above-described cation-exchange membrane and further exposed uniformly for one hour to ultraviolet rays from a distance of 10 centimeters, after which the membrane was water-washed thoroughly and used in the following experiment.

Two of the foregoing surface-treated cation-exchange membranes were disposed severally between an anode and a cathode to constitute an anodic compartment, an intermediate compartment and a cathodic compartment.

Next, a concentrated seawater of pH 7.7 (concentrated to three times its original concentration) was caused to flow through the anodic compartment, while the intermediate and cathodic compartments were circulated with respectively a 4 N sodium chloride solution and a 4 N caustic soda solution, and the electrodialysis was carried out by causing electricity to flow at a current density of 12 A/dm². When the solution of the intermediate compartment was then analyzed, it was found to have a pure salt ratio of 98.5 %. On the other hand, the concentration of the caustic soda solution of the cathodic compartment was 5.0 N.

When, by way of comparison, the electrodialysis was carried out in the same manner as described above, except that a concentrated seawater whose pH was adjusted to 8.4 and concentrated to three times its original concentration was used, the pure salt ratio of the intermediate compartment was 94.5 %, and the concentration of the caustic soda solution of the cathodic compartment was 5.0 N, but a large amount of $Mg(OH)_2$ and $Ca(OH)_2$ was precipitated.

EXAMPLE 13

A combined monomeric solution consisting of 100 parts of styrene, 100 parts of methacrylic acid, 50 parts of divinylbenzene of 50 % purity, 50 parts of toluene and 3 parts of benzoyl peroxide was poured into a 0.5-mm space between two sheets of glass wherein had been sandwiched a polyethylene netting, following which this was heat-polymerized to obtain a membranous macromolecular product.

Next, the chloromethyl groups were introduced to only the surface of the so obtained membranous macromolecular product by chloromethylating it in a customary manner, after which it was further reacted with triphenyl phosphine to obtain a cation-exchange membrane having phosphonium groups in and on its surface and carboxylic acid groups in its interior.

Using the foregoing surface-treated cation-exchange membrane, the continuous electrodialysis of the several seawaters concentrated to two times their original concentration and of pHs adjusted as indicated in Table 12 were carried out with the results shown therein. The current efficiencies shown are average values of 6 months.

Table 12

| Experiment No. | pH of seawater | Pure salt ratio (%) | | | Current efficiency (%) |
|---|---|---|---|---|---|
| | | At the start | 1 month later | 6 months later | |
| 1 | 8.5 | 87 | 85 | 80 | 91 |
| 2 | 8.0 | 87 | 87 | 88 | 91 |
| 3 | 7.0 | 87 | 86 | 87 | 91 |
| 4 | 4.0 | 88 | 88 | 88 | 90 |

EXAMPLE 14

A condensed type cation-exchange membrane prepared in customary manner from phenolsulfonic acid, phenol and formalin had an electric resistance of 10Ω-cm², a transport number of 95 % and a relative transport number $P_{Na}^{Ca}$ of 0.6.

On the other hand, polystyrene of a molecular weight of 20,000 was introduced with the chloromethyl groups in customary manner in the presence of chloromethyl ether and anhydrous stannic chloride to obtain polyvinylbenzyl chloride, after which this was reacted with dimethyl sulfite to synthesize polyvinylbenzylsulfonium chloride.

Next, the above-described cation-exchange membrane was treated by immersing it in a 1 % aqueous solution of the above polyvinylbenzylsulfonium chloride for one hour at 30°C. When the electric resistance, transport number and relative transport number $P_{Na}^{Ca}$ of the so treated membrane were then measured, they were respectively 10Ω-cm², 0.94 and 0.3. In this example, the relative transport number $P_{Na}^{Ca}$ was obtained in the following manner. A cell provided with a pair of silver and silver chloride electrodes was partitioned with the cation-exchange membrane, a 1:1 mixed solution of 0.5 N NaCl and 0.5 N $CaCl_2$ was fed to each of the two compartments, and a direct-current electricity was caused to flow through, the permselectivity being expressed by the relative transport number of the following expression.

$$P_{Na}^{Ca} = (tCa/tNa)/(CCa/CNa)$$

where $tCa$ and $tNa$ are respectively the transport numbers of the Ca and Na ions in the membrane, and CCa and CNa are respectively the concentrations of the Ca and Na ions of the solution.

Using the so treated cation-exchange membrane, the concentration of seawater by continuous electrodialysis was carried out as in the previous examples, using seawaters whose pHs had been adjusted as indicated in Table 13.

Table 13

| Experiment No. | pH of seawater | Pure salt ratio (%) | | | Current efficiency (%) |
|---|---|---|---|---|---|
| | | At the start | 1 month later | 3 months later | |
| 1 | 8.0 | 96 | 95 | 93 | 91 |
| 2 | 6.5 | 96 | 96 | 96 | 90 |
| 3 | 3.2 | 96 | 97 | 96 | 90 |
| 4 | 8.4 | 95 | 90 | 78 | 90 |

EXAMPLE 15

A pasty mixture composed of 200 parts of styrene, 20 parts of benzene, 30 parts of dioctyl phthalate, 3 parts of benzoyl peroxide, 70 parts of finely divided polyethylene and, as a thickener, 4 parts of styrene-butadiene rubber was applied uniformly to a polyethylene netting. After covering the two sides thereof with cellophane, it was heat-polymerized to obtain a membranous, macromolecular product, which was then submitted to a sulfonation treatment with a complex of sulfuric anhydride and dioxane to obtain a cation-exchange membrane.

Next, polyvinyltributylphosphonium bromide was synthesized in accordance with the method disclosed in the literature [J. Polymer Sci., C, 4 849–868 (1963)], after which the above-described cation-exchange membrane was treated with an aqueous solution containing 1,000 ppm of this polyvinyltributylphosphonium bromide by immersion for 24 hours therein.

Using the above cation-exchange membrane, the continuous electrodialytic concentration of seawater was carried out, using as the seawaters those whose pHs had been adjusted as indicated in Table 14 with sulfuric acid. The results obtained are shown in Table 14.

Table 14

| Experiment No. | pH of seawater | Pure salt ratio (%) | | | Current efficiency (%) |
|---|---|---|---|---|---|
| | | At the start | 1 month later | 6 months later | |
| 1 | 8.0 | 90 | 90 | 89 | 90 |
| 2 | 7.6 | 91 | 91 | 91 | 90 |
| 3 | 6.2 | 91 | 90 | 91 | 90 |
| 4 | 3.2 | 91 | 90 | 90 | 90 |
| 5 | 8.2 | 89 | 85 | 78 | 90 |

EXAMPLE 16

The membranous macromolecular product obtained by heat-polymerizing as in Example 8 was treated for 4 hours at 4°C. in a chlorosulfonation bath composed of 200 parts of carbon tetrachloride and 400 parts of chlorosulfonic acid to convert the foregoing product into one containing sulfonyl chloride.

Next, polyglycidyl methacrylate of a molecular weight of 100,000 was reacted with ammonia to an extent that one-half of the glycidyl groups of the polyglycidyl methacrylate were reacted, followed by further reaction with triphenyl phosphine, to synthesize a cationic high polymer whose ratio of N to P was 5:3.

Next, the above-described membranous macromolecular product containing sulfonyl chloride was immersed for 16 hours in a 2 % solution of the polymer obtained above to fix the polymer on the surface of the membrane, after which the membranous macromolecular product was immersed for 4 hours at 25°C. in 1.0 N NaOH to convert it into a sulfonic acid type cation-exchange membrane.

Using the so obtained cation-exchange membrane, the desalting of brine containing 0.443 N of monovalent cations ($Na^+ + K^+$) and 0.117 N of divalent cations ($Ca^{++} + Mg^{++}$) was carried out by the continuous electrodialysis of the brine for 3 months. As shown in Table 15, in one case the brine was used at a pH 8.2 without the addition of an acid, and in another case it was used after adjusting the pH to 5.5 by adding hydrochloric acid. The compositions of the desalted brines are shown in Table 15.

Table 15

| Experiment No. | pH of seawater | Monovalent cations | Divalent cations |
|---|---|---|---|
| 1 | 8.2 | 0.009 N | 0.065 N |
| 2 | 5.5 | 0.004 N | 0.07 N |

EXAMPLE 17

A membranous macromolecular product prepared by heat-polymerization as in Example 15 was treated in a customary manner with phosphorus trichloride and anhydrous aluminum chloride, after which it was hydrolyzed to obtain a cation-exchange membrane having phosphoric acid as its ion-exchange group.

Next, poly-4-vinylpyridine was submitted to a quaternarizing treatment with dodecyl bromide in accordance with the procedure described in the literature [Strauss et al., J. Phy. Chem. 58 577 (1956)]. A 1 % solution of the quaternarized product in benzene was then sprayed uniformly on the above-described cation-exchange membrane to render it into a cation-exchange membrane having a thin cationic layer.

Using the cation-exchange membrane treated as above described, the continuous electrodialytic concentration of seawater concentrated to a concentration three times its original concentration was carried out after adjusting its pH as indicated in Table 16. The results obtained are shown in therein.

Table 16

| Experiment No. | pH of seawater | Pure salt ratio (%) | | | Current efficiency (%) |
|---|---|---|---|---|---|
| | | At the start | 1 month later | 6 months later | |
| 1 | 8.5 | 93 | 88 | 80 | 91 |
| 2 | 8.0 | 94 | 94 | 93 | 91 |
| 3 | 6.0 | 94 | 94 | 94 | 91 |
| 4 | 2.5 | 94 | 94 | 91 | 91 |

What is claimed is:

1. In a method of electrodialyzing seawater containing two or more classes of cations of differing valences, using a cation-exchange membrane, the improvement which comprises using a cation-exchange membrane in which a cationic substance has been caused to be present on and near the surface thereof and adjusting the pH of the seawater to a range of from about 2.5 to 8.0, thereby to selectively electrodialyze the cations of lower valence.

2. The method of claim 1 wherein said pH ranges from about 3.0 to 7.5.

3. The method of claim 1 wherein the adjustment of the pH of the seawater is carried out continuously.

4. The method of claim 1 wherein the molecular weight of said cationic substance is at least 100.

5. The method of claim 1 wherein said cationic substance is present in an amount of at least 0.001 milligram per square decimeter of the cation-exchange membrane.

6. The method of claim 1 wherein said cationic substance is present in an amount of at least 0.1 milligram per square decimeter of the cation-exchange membrane.

7. The method of claim 1 wherein the adjustment of the pH of the seawater is carried out intermittently.

8. The method of claim 7 wherein the adjustment of the pH is made by using an acidic substance intermittently added to the seawater before electrodialysis at a time ratio of at least 1:100.

* * * * *